(12) United States Patent
Shimozawa

(10) Patent No.: US 10,683,932 B2
(45) Date of Patent: Jun. 16, 2020

(54) CONTROL DEVICE FOR DUAL-CLUTCH TRANSMISSION AND DUAL-CLUTCH TRANSMISSION

(71) Applicant: ISUZU MOTORS LIMITED, Shinagawa-ku, Tokyo (JP)

(72) Inventor: Tomoaki Shimozawa, Fujisawa (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 112 days.

(21) Appl. No.: 15/779,503

(22) PCT Filed: Nov. 22, 2016

(86) PCT No.: PCT/JP2016/084549
§ 371 (c)(1),
(2) Date: May 25, 2018

(87) PCT Pub. No.: WO2017/090586
PCT Pub. Date: Jun. 1, 2017

(65) Prior Publication Data
US 2018/0363776 A1 Dec. 20, 2018

(30) Foreign Application Priority Data
Nov. 27, 2015 (JP) .................................. 2015-231819

(51) Int. Cl.
*F16H 61/688* (2006.01)
*F16H 61/06* (2006.01)
(Continued)

(52) U.S. Cl.
CPC ........... *F16H 61/688* (2013.01); *F16H 3/006* (2013.01); *F16H 3/091* (2013.01);
(Continued)

(58) Field of Classification Search
CPC .. F16H 61/688; F16H 61/0021; F16H 61/061; F16H 61/08; F16H 2061/062;
(Continued)

(56) References Cited

U.S. PATENT DOCUMENTS

2006/0040791 A1 2/2006 Nakajima et al.
2007/0144284 A1 6/2007 Mitsubori et al.
(Continued)

FOREIGN PATENT DOCUMENTS

CN 1991217 A 7/2007
CN 101970901 A 2/2011
(Continued)

OTHER PUBLICATIONS

International Search Report and Written Opinion for related International Application No. PCT/JP2016/084549, dated Feb. 14, 2017; English abstract of ISR provided; 7 pages.
(Continued)

*Primary Examiner* — Huan Le
(74) *Attorney, Agent, or Firm* — Procopio, Cory, Hargreaves & Savitch LLP

(57) ABSTRACT

Provided is a hydraulic oil control device having a shifting control unit configured to, in a case where, when upshifting is performed, a number of revolutions of an input shaft connected to a to-be-engaged clutch is higher than a number of revolutions of the engine, or a case where, when downshifting is performed, the number of revolutions of the input shaft is lower than the number of revolutions of the engine, supply the to-be-engaged clutch with a hydraulic oil having a pressure equal to or higher than a predetermined standby pressure, and then to supply the to-be-engaged clutch with the hydraulic oil having the standby pressure, and then configured to cause the to-be-engaged clutch to be engaged (Continued)

by supplying the to-be-engaged clutch with the hydraulic oil having a pressure higher than the standby pressure.

10 Claims, 3 Drawing Sheets

(51) Int. Cl.
| | |
|---|---|
| *F16H 3/00* | (2006.01) |
| *F16H 3/091* | (2006.01) |
| *F16H 61/00* | (2006.01) |
| *F16H 61/08* | (2006.01) |
| *F16H 59/42* | (2006.01) |
| *F16H 59/46* | (2006.01) |
| *F16H 59/68* | (2006.01) |
| *F16H 59/36* | (2006.01) |

(52) U.S. Cl.
CPC ....... *F16H 61/0021* (2013.01); *F16H 61/061* (2013.01); *F16H 59/42* (2013.01); *F16H 59/46* (2013.01); *F16H 59/68* (2013.01); *F16H 61/08* (2013.01); *F16H 2059/366* (2013.01); *F16H 2059/462* (2013.01); *F16H 2059/6807* (2013.01); *F16H 2061/062* (2013.01)

(58) Field of Classification Search
CPC .......... F16H 59/42; F16H 59/46; F16H 59/68; F16H 2059/366; F16H 2059/462; F16H 2059/6807

See application file for complete search history.

(56) References Cited

U.S. PATENT DOCUMENTS

| | | | |
|---|---|---|---|
| 2008/0026910 A1* | 1/2008 | Honma | F16H 61/0403 477/149 |
| 2010/0081547 A1 | 4/2010 | Kobayashi et al. | |
| 2013/0289839 A1* | 10/2013 | Iizuka | F16H 61/0437 701/54 |
| 2015/0166040 A1* | 6/2015 | Cho | F16H 61/061 701/53 |
| 2015/0167755 A1* | 6/2015 | Yoon | F16H 61/12 701/53 |

FOREIGN PATENT DOCUMENTS

| | | |
|---|---|---|
| DE | 102012015150 A1 | 2/2014 |
| EP | 2256369 A1 | 12/2010 |
| JP | H06-185583 A | 7/1994 |
| JP | 2004-197791 A | 7/2004 |
| JP | 2006-057716 A | 3/2006 |
| JP | 2010-121699 A | 6/2010 |
| JP | 2014-156919 A | 8/2014 |

OTHER PUBLICATIONS

Extended European Search Report for related EP App No. 16868533.7 dated Jun. 4, 2019, 9 pgs.

Office Action for CN 201680069252.7 dated Apr. 24, 2019, 23 pages.

* cited by examiner

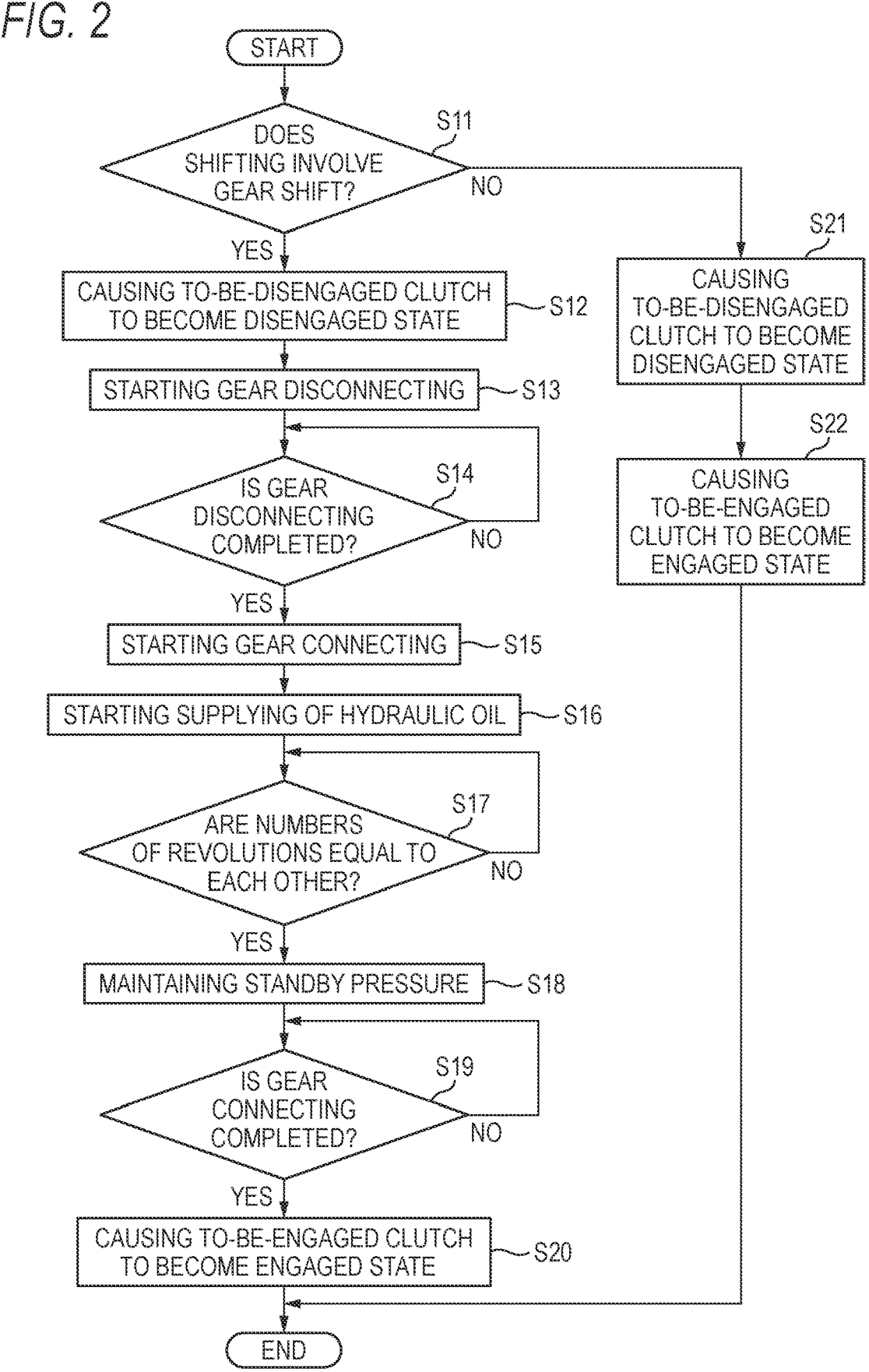

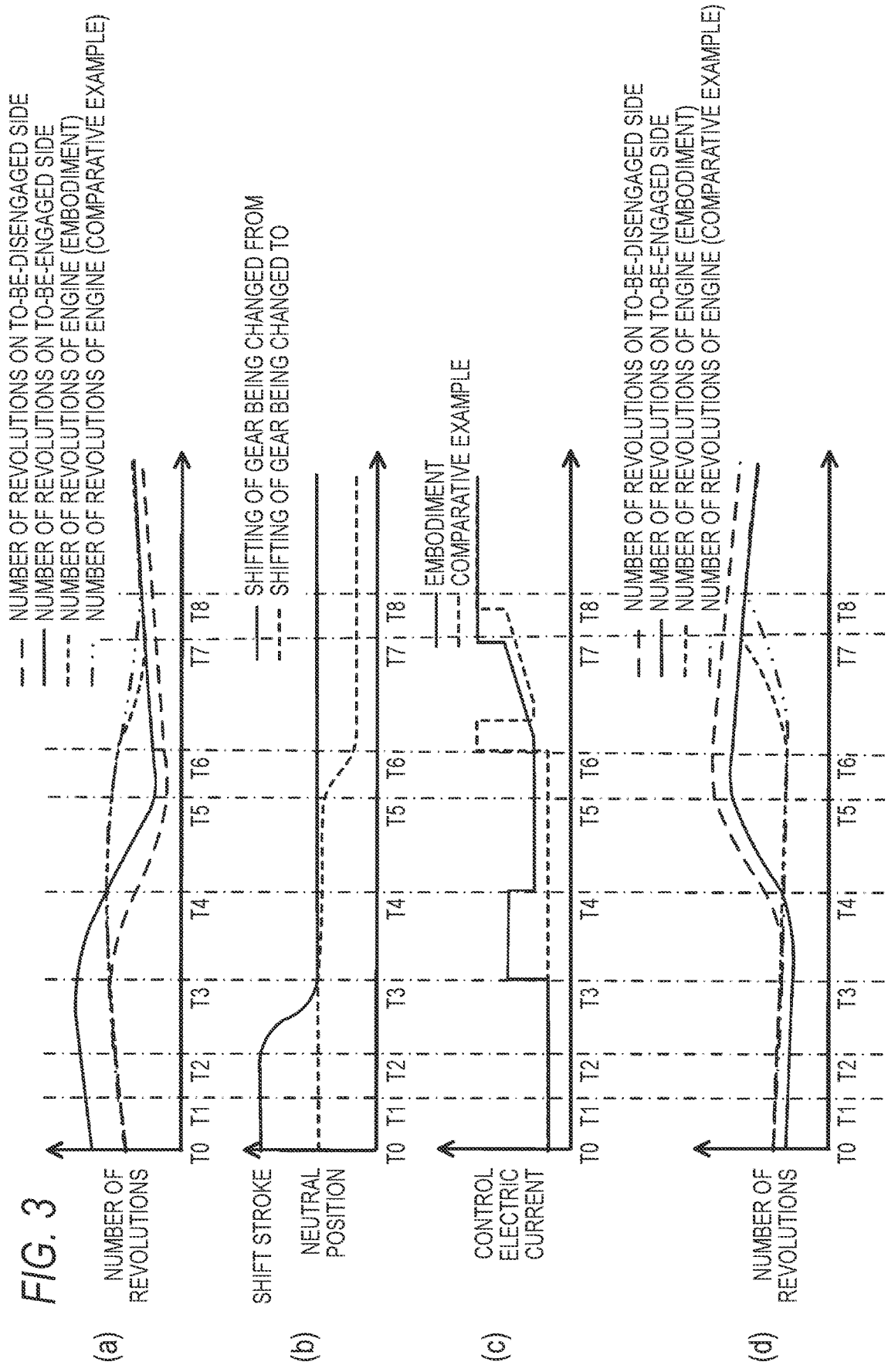

CONTROL DEVICE FOR DUAL-CLUTCH TRANSMISSION AND DUAL-CLUTCH TRANSMISSION

CROSS-REFERENCE TO RELATED APPLICATIONS

This application is a U.S. National Stage entry of PCT Application No: PCT/JP2016/084549 filed on Nov. 22, 2016, which claims priority to Japanese Patent Application No. 2015-231819, filed Nov. 27, 2015, the contents of which are incorporated herein by reference.

TECHNICAL FIELD

The present disclosure relates to a control device for a dual-clutch transmission and to a dual-clutch transmission, in which a clutch device including two clutches is provided between a driving source and a transmission mechanism and a driving power transmission path from the driving source to a vehicle drive system is switched between transmission lines, each of which is formed via one of the clutches.

BACKGROUND ART

Conventionally, a dual-clutch device is known, in which two clutches capable of connecting and disconnecting a power transmission from a driving source, such as an engine, by means of a pressure of a hydraulic oil are provided therein and also a driving power transmission path from the driving source to a transmission is switched between transmission lines, each of which is formed via one of the clutches.

Engaging and disengaging of each of the clutches of such a dual-clutch device are controlled by adjusting an amount or pressure of the hydraulic oil to be supplied to each of the clutches.

Although being different from the clutches configured to perform connecting and disconnecting of a driving power from the driving source as described above, another technique on a clutch controlled by a hydraulic oil is known, in which clutches, which are configured to switch combinations of gears in a transmission gear mechanism to be used to transmit a power, are filled with a hydraulic oil in such a manner that a pressure in a clutch when downshifting is performed becomes a standby pressure (e.g., see Patent Document 1).

PRIOR ART REFERENCE

Patent Document

Patent Document 1: JP-A-2006-57716

DISCLOSURE OF THE INVENTION

Problems to be Solved

For example, in a case where clutches are switched when shifting is performed, a hydraulic oil has already been removed from a hydraulic pressure chamber of a clutch, which is newly to be engaged (to-be-engaged clutch). Thus, in order to fill the hydraulic chamber with the hydraulic oil, a relatively large amount of the hydraulic oil has to be supplied thereto. As a result, a period of time is required until the hydraulic pressure chamber is fully filled with the hydraulic oil, and hence a long period of time is required until the to-be-engaged clutch is fully engaged.

Also, when shifting which involves gear changing is performed, if the hydraulic oil is supplied to the hydraulic pressure chamber of the to-be-engaged clutch during gear changing, there is a risk that the to-be-engaged clutch is engaged so that the gear changing operation is disturbed.

Accordingly, an object of the present disclosure is to provide a technique in which it is possible to quickly perform shifting, which involves both switching of a clutch into an engaged state and changing of a gear.

Means for Solving the Problems

In order to achieve the above object, one aspect of the present disclosure is a control device for a dual-clutch transmission in which a clutch device including a first clutch and a second clutch is provided between a driving source and a transmission mechanism, and a driving power transmission path from the driving source to a vehicle drive system is capable of being switched between a transmission line via the first clutch and a transmission line via the second clutch, wherein the first clutch and the second clutch are capable of being switched between an engaged state and a disengaged state depending on a hydraulic pressure supplied thereto, the control device including: hydraulic oil filling means configured to, in at least one of: (i) a case where, when upshifting which involves switching of a clutch in the engaged state between the first clutch and the second clutch and changing of a gear to be coupled to an output shaft connected to the vehicle drive system is performed, a number of revolutions of an input shaft connected to a to-be-engaged clutch, which is a clutch among the first clutch and the second clutch to be switched into the engaged state, is higher than a number of revolutions of the driving source before the upshifting is performed; or (ii) a case where, when downshifting which involves the switching of the clutch in the engaged state and the changing of the gear to be coupled to the output shaft connected to the vehicle drive system is performed, the number of revolutions of the input shaft connected to the to-be-engaged clutch is lower than the number of revolutions of the driving source before the downshifting is performed, supply the to-be-engaged clutch with a hydraulic oil having a pressure equal to or higher than a predetermined standby pressure which is a pressure required for maintaining the to-be-engaged clutch in a state immediately before being switched into the engaged state, during at least a part of a period of time from when gear disconnecting of a gear before being changed is completed until the number of revolutions of the input shaft becomes equal to the number of revolutions of the driving source, and then supply the to-be-engaged clutch with a hydraulic oil having the standby pressure until gear connecting of a gear being shifted to is completed; and engagement performing means configured to cause the to-be-engaged clutch to be engaged by supplying the to-be-engaged clutch with a hydraulic oil having a pressure higher than the standby pressure after the gear connecting of the gear being shifted to is completed.

In the control device for the dual-clutch transmission, the hydraulic oil filling means may be configured to supply the to-be-engaged clutch with the hydraulic oil having the pressure equal to or higher than the standby pressure from immediately after the gear disconnecting of the gear before being changed is completed.

Further, in the control device for the dual-clutch transmission, the hydraulic oil filling means may be configured to supply the to-be-engaged clutch with the hydraulic oil having a pressure higher than the standby pressure during at least a part of a period of time from when the gear disconnecting of the gear before being changed is completed until the number of revolutions of the input shaft becomes equal to the number of revolutions of the driving source.

Further, in the control device for the dual-clutch transmission, the dual-clutch transmission may be configured such that, when the upshifting which involves the switching of the clutch in the engaged state and the changing of the gear to be coupled to the output shaft connected to the vehicle drive system is performed, the number of revolutions of the input shaft connected to the to-be-engaged clutch is higher than the number of revolutions of the driving source before the upshifting is performed, and such that, when the downshifting which involves the switching of the clutch in the engaged state and the changing of the gear to be coupled to the output shaft connected to the vehicle drive system is performed, the number of revolutions of the input shaft connected to the to-be-engaged clutch is lower than the number of revolutions of the driving source before the downshifting is performed.

Further, in the control device for the dual-clutch transmission, the dual-clutch transmission may include: a first input shaft connected to the first clutch; a second input shaft connected to the second clutch; and a subsidiary shaft normally coupled with the first input shaft and the second input shaft, and a first splitter gear pair coupling the first input shaft with the subsidiary shaft and a second splitter gear pair coupling the second input shaft with the subsidiary shaft may have different gear ratios.

Also, another aspect of the present disclosure is a dual-clutch transmission including a clutch device provided between a driving source and a transmission mechanism and including a first clutch and a second clutch; and a control device capable to switching a driving power transmission path from the driving source to a vehicle drive system between a transmission line via the first clutch and a transmission line via the second clutch, wherein the first clutch and the second clutch are capable of being switched between an engaged state and a disengaged state depending on a hydraulic pressure supplied thereto, wherein the control device includes: hydraulic oil filling means configured to, in at least one of: (i) a case where, when upshifting which involves switching of a clutch in the engaged state between the first clutch and the second clutch and changing of a gear to be coupled to an output shaft connected to the vehicle drive system is performed, a number of revolutions of an input shaft connected to a to-be-engaged clutch, which is a clutch among the first clutch and the second clutch to be switched into the engaged state, is higher than a number of revolutions of the driving source before the upshifting is performed; or (ii) a case where, when downshifting which involves the switching of the clutch in the engaged state and the changing of the gear to be coupled to the output shaft connected to the vehicle drive system is performed, the number of revolutions of the input shaft connected to the to-be-engaged clutch is lower than the number of revolutions of the driving source before the downshifting is performed, supply the to-be-engaged clutch with a hydraulic oil having a pressure equal to or higher than a predetermined standby pressure which is a pressure required for maintaining the to-be-engaged clutch in a state immediately before being switched into the engaged state, during at least a part of a period of time from when gear disconnecting of a gear before being changed is completed until the number of revolutions of the input shaft becomes equal to the number of revolutions of the driving source, and then supply the to-be-engaged clutch with a hydraulic oil having the standby pressure until gear connecting of a gear being shifted to is completed; and engagement performing means configured to cause the to-be-engaged clutch to be engaged by supplying the to-be-engaged clutch with a hydraulic oil having a pressure higher than the standby pressure after the gear connecting of the gear being shifted to is completed.

In the dual-clutch transmission, the hydraulic oil filling means may be configured to supply the to-be-engaged clutch with the hydraulic oil having the pressure equal to or higher than the standby pressure from immediately after the gear disconnecting of the gear before being changed is completed.

Further, in the dual-clutch transmission, the hydraulic oil filling means may be configured to supply the to-be-engaged clutch with the hydraulic oil having a pressure higher than the standby pressure during at least a part of a period of time from when the gear disconnecting of the gear before being changed is completed until the number of revolutions of the input shaft becomes equal to the number of revolutions of the driving source.

Further, in the dual-clutch transmission, the dual-clutch transmission may be configured such that, when the upshifting which involves the switching of the clutch in the engaged state and the changing of the gear to be coupled to the output shaft connected to the vehicle drive system is performed, the number of revolutions of the input shaft connected to the to-be-engaged clutch is higher than the number of revolutions of the driving source before the upshifting is performed, and such that, when the downshifting which involves the switching of the clutch in the engaged state and changing of the gear to be coupled to the output shaft connected to the vehicle drive system is performed, the number of revolutions of the input shaft connected to the to-be-engaged clutch is lower than the number of revolutions of the driving source before the downshifting is performed.

Further, the dual-clutch transmission may further include: a first input shaft connected to the first clutch; a second input shaft connected to the second clutch; and a subsidiary shaft normally coupled with the first input shaft and the second input shaft, and a first splitter gear pair coupling the first input shaft with the subsidiary shaft and a second splitter gear pair coupling the second input shaft with the subsidiary shaft may have different gear ratios.

Advantageous Effects of Invention

According to the present disclosure, it is possible to quickly perform shifting, which involves both switching of a clutch into an engaged state and changing of a gear.

BRIEF DESCRIPTION OF DRAWINGS

FIG. 2 is a flow chart showing a shifting control process according to one embodiment of the present disclosure.

In FIG. 3, (a) is a view showing a change in the number of revolutions of an input shaft and the number of revolutions of an engine when upshifting is performed; (b) is a view showing a change in shift stroke; (c) is a view showing a change in control electric current for linear solenoid valves for adjusting a hydraulic oil for clutches; and (d) is a view showing a change in the number of revolutions of the input shaft and the number of revolutions of the engine when downshifting is performed.

MODE FOR CARRYING OUT THE INVENTION

Figure 1:
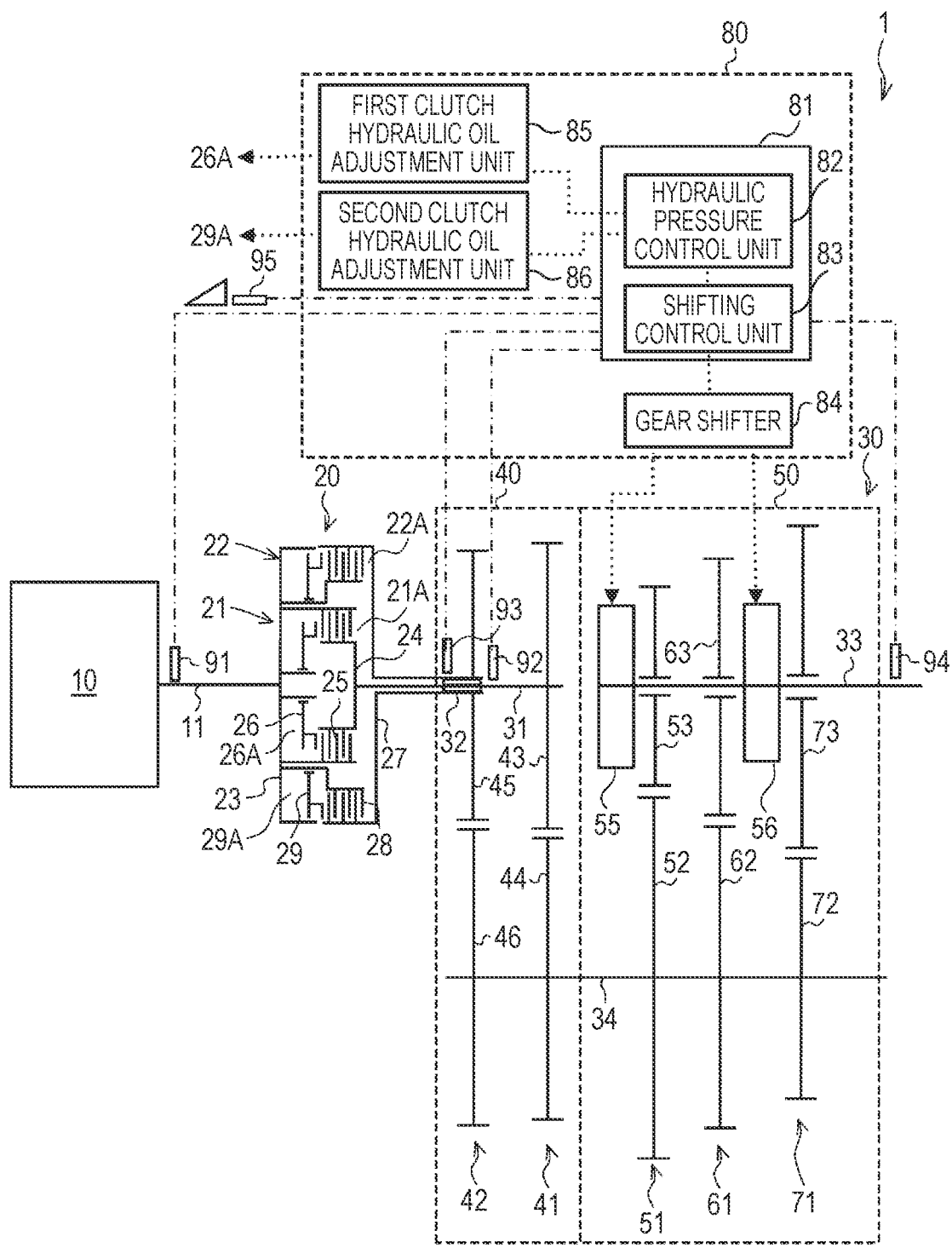
FIG. 1 is a schematic configuration diagram showing a dual-clutch transmission having a dual-clutch device according to one embodiment of the present disclosure.

Hereinafter, a shifting control device, which is an example of a control device for a dual-clutch automatic transmission according to one embodiment of the present disclosure, will be described with reference to the accompanying drawings. The same components are designated by the same reference numerals, and names and functions thereof are the same. Therefore, the detailed description thereof will be not repeated.

FIG. 1 is a schematic configuration diagram showing a dual-clutch transmission having a dual-clutch device according to one embodiment of the present disclosure.

The dual-clutch transmission 1 is connected to an output shaft 11 of an engine 10, which is one example of a driving source.

The dual-clutch transmission 1 includes a dual-clutch device 20 having a first clutch 21 and a second clutch 22; a transmission mechanism 30; a shifting control device 80 as one example of a control device; an engine revolution number sensor 91; a first input shaft revolution number sensor 92; a second input shaft revolution number sensor 93; a vehicle speed sensor 94 (also referred to as an output revolution number sensor); and an accelerator opening rate sensor 95.

The first clutch 21 is, for example, a wet multi-plate clutch and includes a clutch hub 23 configured to integrally rotate with the output shaft 11 of the engine 10; a first clutch drum 24 configured to integrally rotate with a first input shaft 31 of the transmission mechanism 30; a plurality of first clutch plates 25; a first space 21A around the plurality of first clutch plates 25; a first piston 26 for pressing the first clutch plates 25 against each other; and a first hydraulic pressure chamber 26A.

If the first piston 26 is stroked toward an output side (in a right direction in FIG. 1) by a pressure of a hydraulic oil (hydraulic pressure) supplied to the first hydraulic pressure chamber 26A, the first clutch plates 25 are pressed against each other and thus the first clutch 21 becomes a connected state (engaged state) where the first clutch 21 transmits a torque. On the other hand, if the hydraulic pressure of the first hydraulic pressure chamber 26A is released, the first piston 26 is stroked toward an input side (in a left direction in FIG. 1) by an urging force of a spring (not shown) and thus the first clutch 21 becomes a disengaged state where the first clutch 21 blocks a power transmission. Meanwhile, in the following description, a state where a torque is transmitted via the first clutch plates 25 while the clutch hub 23 and the first clutch drum 24 are rotated at different RPMs is referred to as a half clutch state of the first clutch 21. The half clutch state is one aspect of the engaged state. Herein, a pressure of a hydraulic oil required to maintain the first piston 26 at a position immediately before the plurality of first clutch plates 25 come in contact with each other is referred as a standby pressure. Meanwhile, the standby pressure corresponds to a pressure balanced with a reaction force of a return spring (not shown) for urging the first piston 26 to the input side. In order to discharge a frictional heat generated in the first clutch plates 25 and the like, a hydraulic oil is supplied to the first space 21A.

The second clutch 22 is, for example, a wet multi-plate clutch and includes a clutch hub 23; a second clutch drum 27 configured to integrally rotate with a second input shaft 32 of the transmission mechanism 30; a plurality of second clutch plates 28; a second space 22A around the plurality of second clutch plates 28; a second piston 29 for pressing the second clutch plates 28 against each other; and a second hydraulic pressure chamber 29A.

If the second piston 29 is stroked toward the output side (in the right direction in FIG. 1) by an hydraulic pressure supplied to the second hydraulic pressure chamber 29A, the second clutch plates 28 are pressed against each other and thus the second clutch 22 becomes a connected state (engaged state) where the second clutch 22 transmits a torque. On the other hand, if the hydraulic pressure is released, the second piston 29 is stroked toward the input side (in the left direction in FIG. 1) by an urging force of a spring (not shown), the second clutch 22 becomes a disengaged state where the second clutch 22 blocks a power transmission. Meanwhile, in the following description, a state where a torque is transmitted via the second clutch plates 28 while the clutch hub 23 and the second clutch drum 27 are rotated at different RPMs is referred to as a half clutch state of the second clutch 22. The half clutch state is one aspect of the engaged state. Herein, a pressure of a hydraulic oil required to maintain the second piston 29 at a position immediately before the plurality of second clutch plates 28 come in contact with each other is referred as a standby pressure. Meanwhile, the standby pressure corresponds to a pressure balanced with a reaction force of a return spring (not shown) for urging the second piston 29 to the input side. Here, the standby pressure in the first clutch 21 and the standby pressure in the second clutch 22 depend on respective configurations thereof and may be set to be the same pressure. In order to discharge a frictional heat generated in the second clutch plates 28 and the like, a hydraulic oil is supplied to the second space 22A.

The transmission mechanism 30 includes a subsidiary transmission portion 40 arranged on the input side and a main transmission portion 50 arranged on the output side. Also, the transmission mechanism 30 includes first and second input shafts 31, 32 provided in the subsidiary transmission portion 40, an output shaft 33 provided in the main transmission portion 50, and a subsidiary shaft 34 arranged parallel to the shafts 31 to 33. The first input shaft 31 is relatively rotatably inserted in a hollow shaft extending through the second input shaft 32 in an axial direction thereof. An output end of the output shaft 33 is connected to a propeller shaft, which is also connected to vehicle driving wheels via a differential gear device and the like (vehicle drive system) (all not shown).

The subsidiary transmission portion 40 is provided with a first splitter gear pair 41 and a second splitter gear pair 42. The first splitter gear pair 41 has a first input main gear 43 fixed on the first input shaft 31, and a first input subsidiary gear 44 fixed on the subsidiary shaft 34 and normally engaged with the first input main gear 43. The second splitter gear pair 42 has a second input main gear 45 fixed on the second input shaft 32, and a second input subsidiary gear 46 fixed on the subsidiary shaft 34 and normally engaged with the second input main gear 45. Thus, the subsidiary shaft 34 is normally coupled with the first and second input shafts 31 and 32. In the present embodiment, a gear ratio of the first splitter gear pair 41 is smaller than that of the second splitter gear pair 42. That is, the first splitter gear pair 41 constitutes a high speed shift stage. Therefore, the subsidiary transmission portion 40 can become a high speed shift stage when a driving power is transmitted via the first splitter gear pair 41 (when the first clutch 21 is engaged), and also can become a low speed shift stage when a driving power is transmitted via the second splitter gear pair 42 (when the second clutch 22 is engaged). Herein, the case where the driving power is transmitted via the first splitter gear pair 41 is referred to as a H (high speed) stage, and the case where the driving power is transmitted via the second splitter gear pair 42 is referred to as a L (low speed) stage.

The main transmission portion 50 is provided with a first output gear pair 51, a second output gear pair 61, a third output gear pair 71, a first synchro mechanism 55, and a second synchro mechanism 56. The first output gear pair 51 has a 3rd stage subsidiary shaft 52 fixed on the subsidiary shaft 34, and a 3rd stage main gear 53 relatively rotatably provided on the output shaft 33 and normally engaged with the 3rd stage subsidiary shaft 52. The second output gear pair 61 has a 2nd stage subsidiary shaft 62 fixed on the subsidiary shaft 34, and a 2nd stage main gear 63 relatively rotatably provided on the output shaft 33 and normally engaged with the 2nd stage subsidiary shaft 62. The third output gear pair 71 has a 1st stage subsidiary shaft 72 fixed on the subsidiary shaft 34, and a 1st stage main gear 73 relatively rotatably provided on the output shaft 33 and normally engaged with the 1st stage subsidiary shaft 72.

The first synchro mechanism 55 and the second synchro mechanism 56 are known structures and include a dog clutch, a sleeve and the like (all not shown). The first synchro mechanism 55 can cause the output shaft 33 and the 3rd stage main gear 53 to be engaged (gear connected) with each other. In a case where the output shaft 33 and the 3rd stage main gear 53 are engaged with each other, if the subsidiary transmission portion 40 is the H stage, the output shaft 33 rotates to correspond to a 3rd stage at the H stage (3H stage), whereas if the subsidiary transmission portion 40 is the L stage, the output shaft 33 rotates to correspond to a 3rd stage at the L stage (3L stage).

The second synchro mechanism 56 can cause the output shaft 33 and the 2nd stage main gear 63 to be engaged with each other and also cause the output shaft 33 and the 1st stage main gear 73 to be engaged with each other. In a case where the output shaft 33 and the 2nd stage main gear 63 are engaged with each other, if the subsidiary transmission portion 40 is the H stage, the output shaft 33 rotates to correspond to a 2nd stage at the H stage (2H stage), whereas if the subsidiary transmission portion 40 is the L stage, the output shaft 33 rotates to correspond to a 2nd stage at the L stage (2L stage). In a case where the output shaft 33 and the 1st stage main gear 73 are engaged with each other, if the subsidiary transmission portion 40 is the H stage, the output shaft 33 rotates to correspond to a 1st stage at the H stage (1H stage), whereas if the subsidiary transmission portion 40 is the L stage, the output shaft 33 rotates to correspond to a 1st stage at the L stage (1L stage).

The transmission mechanism 30 can be switched into the 1L stage, the 1H stage, the 2L stage, the 2H stage, the 3L stage and the 3H stage by the subsidiary transmission portion 40 and the main transmission portion 50. The transmission mechanism 30 includes the 1L stage, the 1H stage, the 2L stage, the 2H stage, the 3L stage and the 3H stage in this order from the lowest speed stage. Operation of the first synchro mechanism 55 and the second synchro mechanism 56 is controlled by a shifting control unit 83 as described below and is configured to selectively switch the output shaft 33 and the output main gears (53, 63, 73) into an engaged state (gear connected state) or a disengaged state (neutral state), depending on an accelerator opening rate detected by the accelerator opening rate sensor 95, a speed detected by the speed sensor 94 and the like. Meanwhile, the number of the output gear pairs (51, 61, 71) or the synchro mechanisms (55, 56), the arrangement pattern thereof and the like are not limited to the shown example, but can be appropriately changed without departing from the spirit and scope of the present disclosure.

In the transmission mechanism 30, shifting (upshifting and downshifting) between the 1L stage and the 1H stage, between the 2L stage and 2H stage and between the 3L stage and the 3H stage can be performed by only clutch switching, whereas shifting (upshifting and downshifting) between the 1H stage and the 2L stage and between the 2H stage and the 3L stage involves both clutch switching and gear changing.

Also, in the transmission mechanism 30, when upshifting which involves both clutch switching and gear changing (upshifting from the 1H stage to the 2H stage next thereto (next thereto in arrangement of shift ratios), upshifting from the 2H stage to the 3L stage next thereto, and the like) is performed, the number of revolutions of the second input shaft 32 connected to a to-be-engaged clutch (second clutch 22) is higher than the number of revolutions of the engine 10 before upshifting is performed due to the configuration of the transmission mechanism 30. Therefore, according to the transmission mechanism 30, when upshifting which involves both clutch switching and gear changing is performed, it is assured that the number of revolutions of the second input shaft 32 connected to the to-be-engaged clutch (second clutch 22) is higher than the number of revolutions of the engine 10. Also, in the transmission mechanism 30 of the present embodiment, when downshifting which involves both clutch switching and gear changing (downshifting from the 2L stage to the 1H stage next thereto, downshifting from the 3L stage to the 2H stage next thereto and the like) is performed, the number of revolutions of the first input shaft 31 connected to a to-be-engaged clutch (first clutch 21) is lower than the number of revolutions of the engine 10 before downshifting is performed due to the configuration of the transmission mechanism 30. Therefore, according to the transmission mechanism 30, when downshifting which involves both clutch switching and gear changing is performed, it is assured that the number of revolutions of the first input shaft 31 connected to the to-be-engaged clutch (first clutch 21) is lower than the number of revolutions of the engine 10.

The engine revolution number sensor 91 detects the number of revolutions of the engine 10 and then outputs the number of revolutions to the shifting control device 80. The first input shaft revolution number sensor 92 detects the number of revolutions of the first input shaft 31 and then outputs the number of revolutions to the shifting control device 80. The second input shaft revolution number sensor 93 detects the number of revolutions of the second input shaft 32 and then outputs the number of revolutions to the shifting control device 80. The vehicle speed sensor 94 detects the number of revolutions of the output shaft 33 and then outputs the number of revolutions to the shifting control device 80. A vehicle speed can be specified from the number of revolutions of the output shaft 33. The accelerator opening rate sensor 95 detects an accelerator opening rate and then outputs the accelerator opening rate to the shifting control device 80.

The shifting control device 80 includes a control unit 81, a gear shifter 84, a first clutch hydraulic oil adjustment unit 85 and a second clutch hydraulic oil adjustment unit 86.

The control unit 81 is intended to perform various controls for the engine 10, the first clutch hydraulic oil adjustment unit 85, the second clutch hydraulic oil adjustment unit 86, the gear shifter 84 and the like and includes a CPU, a ROM, a RAM, an input port, an output port and the like, which are well known. In order to perform these various controls, sensor values of various sensors (91 to 95) are inputted to the control unit 81.

Also, the control unit 81 includes, as partial functional elements, a hydraulic pressure control unit 82 and a shifting control unit 83, which is examples of hydraulic oil filling means and engagement performing means. In the present embodiment, the functional elements are described as being contained in the control unit 81, which is a unitary hardware, but some thereof may be provided in separate hardware.

The hydraulic pressure control unit 82 is configured to output a control signal (control electric current) to the first clutch hydraulic oil adjustment unit 85 and the second clutch hydraulic oil adjustment unit 86 depending on an instruction of the shifting control unit 83.

The shifting control unit 83 is configured to determine whether shifting is required on the basis of information, such as an accelerator opening rate from the accelerator opening rate sensor 95 and a vehicle speed from the vehicle speed sensor 94, and then to specify a required shifting (shift stage being shifted to) if shifting is required. Also, the shifting control unit 83 is configured to determine whether the required shifting is performed by only clutch switching or involves gear changing (gear shift) in addition to clutch switching.

If the shifting is performed by only clutch switching, the shifting control unit 83 instructs the hydraulic pressure control unit 82 to switch a clutch, which is to be engaged.

In addition, if the shifting involves gear changing (gear shift), the shifting control unit 83 instructs the gear shifter 84 to change a gear (to disconnect a current gear (gear being shifted from) and also to gear connect a gear being shifted to). Also, if a state after gear disconnecting is completed corresponds to one of a case where the number of revolutions of an input shaft connected to a to-be-engaged clutch when upshifting is performed is higher than the number of revolutions of the engine 10, or a case where the number of revolutions of an input shaft connected to a to-be-engaged clutch when downshifting is performed is lower than the number of revolutions of the engine 10, the shifting control unit 83 instructs the hydraulic pressure control unit 82 to supply a hydraulic oil in such a manner that a pressure of the hydraulic oil to be supplied to the to-be-engaged clutch is higher than the standby pressure thereof. In this case, since the pressure higher than the standby pressure is supplied to the to-be-engaged clutch, a piston of the to-be-engaged clutch can be properly moved against a frictional force on the surroundings of the piston toward a side, on which the clutch become the engaged state.

Meanwhile, in the transmission mechanism 30, downshifting or upshifting which involves gear changing corresponds to one of the case where the number of revolutions of the input shaft connected to the to-be-engaged clutch when upshifting is performed is higher than the number of revolutions of the engine 10, or the case where the number of revolutions of the input shaft connected to the to-be-engaged clutch when downshifting is performed is lower than the number of revolutions of the engine 10. Therefore, when shifting involving gear changing is performed, the shifting control unit 83 does not need to directly compare between sensor values on the number of revolutions of the input shaft connected to the to-be-engaged clutch and the number of revolutions of the engine 10 or the like.

After instructing the hydraulic pressure control unit 82 to supply the hydraulic oil in such a manner that the pressure of the hydraulic oil to be supplied to the to-be-engaged clutch is higher than the standby pressure thereof, the shifting control unit 82 instructs the hydraulic pressure control unit 82 to supply the hydraulic oil in such a manner that the pressure of the hydraulic oil to be supplied to the to-be-engaged clutch becomes the standby pressure, if the number of revolutions of the input shaft connected to the to-be-engaged clutch detected by the first input shaft revolution number sensor 92 or the second input shaft revolution number sensor 93 becomes equal to the number of revolutions of the engine 10 detected by the engine revolution number sensor 91.

Thereafter, if gear connecting is completed, the shifting control unit 83 instructs the hydraulic pressure control unit 82 to supply the hydraulic oil at a pressure higher than the standby pressure so that the to-be-engaged clutch is fully engaged.

The gear shifter 84 is configured to operate the first synchro mechanism 55 and the second synchro mechanism 56 depending on an instruction of the shifting control unit 83, thereby causing the output shaft 33 and the output main gears (53, 63, 73) to be disengaged (gear disconnected) from each other or causing the output shaft 33 and the output main gears (53, 63, 73) to be engaged (gear connected) with each other.

The first clutch hydraulic oil adjustment unit 85 has, for example, a linear solenoid valve and is configured to adjust an amount and pressure of a hydraulic oil to be supplied to the first hydraulic pressure chamber 26A by adjusting the hydraulic oil from a hydraulic oil supply source (not shown) depending on a control signal (control electric current) supplied to the hydraulic pressure control unit 82.

The second clutch hydraulic oil adjustment unit 86 has, for example, a linear solenoid valve and is configured to adjust an amount and pressure of a hydraulic oil to be supplied to the second hydraulic pressure chamber 29A by adjusting the hydraulic oil from a hydraulic oil supply source (not shown) depending on a control signal (control electric current) supplied to the hydraulic pressure control unit 82.

Next, a shifting control process by the shifting control device 80 will be described.

FIG. 2 is a flow chart showing a shifting control process according to one embodiment of the present disclosure.

The shifting control process is performed if the shifting control unit 83 determines that shifting is required.

The shifting control unit 83 determines whether or not the shifting involves gear changing (gear shift) (S11). As a result, if the shifting does not involve gear changing (S11: NO), the shifting control unit 83 controls one of the first clutch hydraulic oil adjustment unit 85 and the second clutch hydraulic oil adjustment unit 86 using the hydraulic pressure control unit 82, thereby causing a clutch (to-be-disengaged clutch), which is currently in an engaged state and thus has to be disengaged, to become the disengaged state (Step S21), and also controls the other of the first clutch hydraulic oil adjustment unit 85 and the second clutch hydraulic oil adjustment unit 86, thereby causing a to-be-engaged clutch to become the engaged state (Step S22). Then, the process is ended.

On the other hand, if the shifting involves gear changing (S11: YES), the shifting control unit 83 controls one of the first clutch hydraulic oil adjustment unit 85 and the second clutch hydraulic oil adjustment unit 86 using the hydraulic pressure control unit 82, thereby causing the to-be-disengaged clutch to become the disengaged state (Step S12), and also controls the gear shifter 84 to start to gear disconnect a current gear (gear being shifted from), which has been engaged with the output shaft 33 (S13).

Subsequently, the shifting control unit 83 determines whether or not gear disconnecting the gear being shifted from is completed (S14), and then if the gear disconnecting is not completed (S14: NO), the shifting control unit 83 performs the step S14 again.

On the other hand, if the gear disconnecting is completed (S14: YES), the shifting control unit 83 controls the gear shifter 84 to start to connect a gear being shifted to (S15).

Subsequently, the shifting control unit 83 controls one of the first clutch hydraulic oil adjustment unit 85 and the second clutch hydraulic oil adjustment unit 86 using the hydraulic pressure control unit 82, thereby starting to supply the hydraulic oil so that a pressure higher than the standby pressure is supplied to the to-be-engaged clutch (S16). Thus, a hydraulic pressure chamber of the to-be-engaged clutch is fully filled with the hydraulic oil.

Subsequently, the shifting control unit 83 determines whether or not the number of revolutions of the input shaft connected to the to-be-engaged clutch is equal to the number of revolutions of the engine 10 detected by the engine revolution number sensor 91 (S17). As a result, if the number of revolutions of the input shaft is not equal to the number of revolutions of the engine 10 (S17: NO), the shifting control unit 83 performs the step S17 again.

On the other hand, in the case where the number of revolutions of the input shaft is equal to the number of revolutions of the engine 10 (S17: YES), then a driving power of the engine 10 is applied in a direction disturbing a synchronizing operation of a synchro mechanism, i.e., in a direction increasing a difference in the number of revolutions between the output shaft 33 and the gear being shifted to, which are to be synchronized with each other, if the to-be-engaged clutch becomes a half clutch state before the gear connecting is completed. In order to prevent such a situation, the shifting control unit 83 controls the hydraulic pressure control unit 82 in such a manner that a pressure of the hydraulic oil to be supplied to the to-be-engaged clutch is maintained at the standby pressure thereof (S18).

Subsequently, the shifting control unit 83 determines whether or not gear connecting of the gear being shifted to is completed (S19), and then if the gear connecting is not completed (S19: NO), the shifting control unit 83 performs the step S19 again.

On the other hand, if the gear connecting is completed (S19: YES), the shifting control unit 83 controls one of the first clutch hydraulic oil adjustment unit 85 and the second clutch hydraulic oil adjustment unit 86 using the hydraulic pressure control unit 82, in such a manner that the hydraulic oil having a pressure higher than the standby pressure is supplied to the to-be-engaged clutch, thereby causing the to-be-engaged clutch to be fully engaged (S20). Herein, in the state where the gear connecting is completed, the to-be-engaged clutch has already been filled with the hydraulic oil and thus maintained at the standby pressure. Thus, if supplying of the hydraulic oil having a pressure higher than the standby pressure is started, the to-be-engaged clutch is becomes fully engaged early.

Next, various state changes when shifting of the dual-clutch transmission 1 according to the present embodiment is performed will be described.

In FIG. 3, (a) is a view showing a change in the number of revolutions of the input shaft and the number of revolutions of the engine when upshifting is performed; (b) is a view showing a change in shift stroke; (c) is a view showing a change in control electric current for linear solenoid valves for adjusting a hydraulic oil for clutches; and (d) is a view showing a change in the number of revolutions of the input shaft and the number of revolutions of the engine when downshifting is performed.

As a case of upshifting involving gear changing, for example, a case where shifting is performed from the 2H stage to the 3L stage will be described by way of example with reference to (a), (b) and (c) of FIG. 3.

At the time T0 before upshifting is started, the first clutch 21, which is a to-be-disengaged clutch, is in a fully engaged state, and hence the number of revolutions of the engine and the number of revolutions of the first input shaft 31 connected to the first clutch 21 (the number of revolutions on the to-be-disengaged side) are the same. On the other hand, since the first clutch 21 and the second clutch 22 are coupled to each other with a predetermined gear ratio via the subsidiary shaft 34 and the like, the number of revolutions of the second input shaft 32 connected to the second clutch 22, which is the to-be-engaged clutch, (the number of revolutions on the to-be-engaged side) is higher than the number of revolutions on the to-be-disengaged side.

At the time T0, a gear being shifted from (2nd stage main gear 63) is in a gear connected state as shown in (b) of FIG. 3. Also, a control electric current outputted to the second clutch hydraulic oil adjustment unit 86 by the hydraulic pressure control unit 82 has the lowest value as shown in (c) of FIG. 3. Since the control electric current has the lowest value, a hydraulic oil is not supplied to the second hydraulic pressure chamber 29A of the second clutch 22.

Subsequently, if at a time T1, the shifting control unit 83 determines that upshifting from the 2H stage to the 3L stage involving gear changing is required, the shifting control unit 83 controls the hydraulic pressure control unit 82 to cause to the first clutch 21 to become the disengaged state.

Then, at a time T2, the shifting control unit 83 starts to move a sleeve (not shown) of the second synchro mechanism 56 using the gear shifter 84, thereby starting to gear disconnect the 2nd stage main gear 63.

Thus, as shown (b) of FIG. 3, a stroke (shift stroke) of the sleeve (not shown) of the second synchro mechanism 56 is moved from a gear connected position shown at the time T2 to a direction of a neutral position and then reaches the neutral position once gear disconnecting is completed (Time T3).

At the time T3, since the gear disconnecting has been completed, the shifting control unit 83 controls the gear shifter 84 to start to move the sleeve (not shown) of the first synchro mechanism 55, thereby starting to gear connect a gear being shifted to (3rd stage main gear 53).

Once the gear connecting is started at the time T3, synchronizing between the output shaft 33 (the sleeve of the first synchro mechanism 55) and the 3rd stage main gear 53 is started by the first synchro mechanism 55. Thus, as shown in (a) of FIG. 3, after the time T3, the number of revolutions of the second input shaft 22 (the number of revolutions on the to-be-engaged side) is gradually decreased to be synchronized with the number of revolutions of the output shaft 33. On the other hand, as shown in (a) of FIG. 3, the number of revolutions of the engine is maintained at a substantially constant number of revolutions in a no-load state.

Also, if the gear connecting is started at the time T3, the shifting control unit 83 outputs a control electric current for controlling the second clutch hydraulic oil adjustment unit 86 using the hydraulic pressure control unit 82 in such a manner that a pressure higher than the standby pressure is supplied to the second clutch 22. Thus, the second hydraulic pressure chamber 29A of the second clutch 22 is filled with the hydraulic oil. At this time, if the second clutch 22 becomes a half clutch state, the hydraulic oil acts in a direction decreasing the number of revolutions of the second output shaft 32, i.e., in a direction assisting synchronizing by the first synchro mechanism 55, thereby effectively working on synchronizing.

If, as shown in (a) of FIG. 3, the number of revolutions on the to-be-engaged side becomes equal to the number of revolutions of the engine (Time T4), the shifting control unit 83 outputs a control electric current for controlling the second clutch hydraulic oil adjustment unit 86 in such a manner that the standby pressure is supplied to the second clutch 22. Thus, a pressure of the second hydraulic pressure chamber 29A of the second clutch 22 is adjusted to the standby pressure.

If synchronizing between the output shaft 33 (the sleeve of the first synchro mechanism 55) and the 3rd stage main gear 53 is completed (Time T5), as shown in (b) of FIG. 3, the first synchro mechanism 55 moves the sleeve to a position, where the sleeve is coupled with a dog gear of the 3rd stage main gear 53, thereby completing the gear connecting (Time T6).

Once the gear connecting of the 3rd stage main gear 53 is completed, the shifting control unit 83 controls the hydraulic pressure control unit 82 to gradually increase the pressure of the hydraulic oil, which is to be supplied to the second clutch 22, to a predetermined maximum pressure (Time T7) and then maintains this state until an instruction of changing the second clutch 22 into the disengaged state is provided thereto.

If the gear connecting has been completed at the time T6 and then the pressure of the hydraulic oil to be supplied to the second clutch 22 is gradually increased, the second clutch 22 first becomes the half clutch state and then slip thereof in the half clutch state gradually decreases. Therefore, as shown in (a) of FIG. 3, after the time T6, a difference between the number of revolutions on the to-be-engaged side and the number of revolutions of the engine is gradually reduced, and then at the time T7, the number of revolutions on the to-be-engaged side becomes equal to the number of revolutions of the engine, so that the second clutch 22 becomes a fully engaged state.

Herein, in order to clarify the effects of the shifting control device 80 according to the present embodiment, comparison thereof with a comparative example will be made.

In the comparative example, as shown by a broken line in (c) of FIG. 3, supplying a hydraulic oil to the second hydraulic pressure chamber 29A of the second clutch 22 is started after the time T6 when gear connecting of a gear being shifted to is completed. Therefore, a long period of time is required from a time when filling a hydraulic oil into the second hydraulic pressure chamber 29A is started until the second hydraulic pressure chamber 29A becomes the standby pressure. For this reason, a long period of time is required until the second clutch 22 becomes a fully engaged state by way of a half clutch state. Accordingly, the fully engaged state where the number of revolutions on the to-be-engaged side and the number of revolutions of the engine become equal to each other is realized at a time T8, which is later than the time T7 when it can be realized in the present embodiment, as shown in (a) of FIG. 3. From the above, it can be seen that shifting in the present embodiment can be completed earlier than in the comparative example.

Next, as a case of downshifting involving gear changing, for example, a case where shifting is performed from the 3L stage to the 2H stage will be described by way of example with reference to (b), (c) and (d) of FIG. 3. Meanwhile, for the sake of convenience, (b) and (c) of FIG. 3 are used for illustrating the case of downshifting as well as the case of upshifting as described above. However, times T0 to T8 in the figures are not necessarily the same between the case of downshifting and the case of upshifting.

At the time T0 before downshifting is started, the second clutch 22, which is a to-be-disengaged clutch, is in an engaged state, and hence as shown in (d) of FIG. 3, the number of revolutions of the engine and the number of revolutions of the second input shaft 32 connected to the second clutch 22 (the number of revolutions on the to-be-disengaged side) are the same. On the other hand, since the first clutch 21 and the second clutch 22 are coupled to each other with a predetermined gear ratio via the subsidiary shaft 34 and the like, the number of revolutions of the second input shaft 32 connected to the second clutch 22, which is the to-be-engaged clutch, (the number of revolutions on the to-be-engaged side) is lower than the number of revolutions on the to-be-disengaged side.

At the time T0, a gear being shifted from (3rd stage main gear 53) is in a gear connected state as shown in (b) of FIG. 3. Also, a control electric current outputted to the first clutch hydraulic oil adjustment unit 85 by the hydraulic pressure control unit 82 has the lowest value as shown in (c) of FIG. 3. Since the control electric current has the lowest value, a hydraulic oil is not supplied to the first hydraulic pressure chamber 26A of the first clutch 21.

Subsequently, if at a time T2, the shifting control unit 83 determines that downshifting from the 3L stage to the 2H stage involving gear changing is required, the shifting control unit 83 controls the hydraulic pressure control unit 82 to cause the second clutch 22 to become the disengaged state.

Then, at the time T2, the shifting control unit 83 starts to move a sleeve (not shown) of the first synchro mechanism 55 using the gear shifter 84, thereby starting to gear disconnect the 3rd stage main gear 53.

Thus, as shown in (b) of FIG. 3, a stroke (shift stroke) of the sleeve (not shown) of the first synchro mechanism 55 is moved from a gear connecting position shown at the time T2 to a direction of a neutral position and then reaches the neutral position once gear disconnecting is completed (Time T3).

At the time T3, since the gear disconnecting has been completed, the shifting control unit 83 controls the gear shifter 84 to start to move the sleeve (not shown) of the second synchro mechanism 56, thereby starting to gear connect a gear being shifted to (2nd stage main gear 63).

Once the gear connecting is started at the time T3, synchronizing between the output shaft 33 (the sleeve of the second synchro mechanism 56) and the 2nd stage main gear 63 is started by the second synchro mechanism 56. Thus, as shown in (d) of FIG. 3, after the time T3, the number of revolutions of the first input shaft 21 (the number of revolutions on the to-be-engaged side) is gradually increased to be synchronized with the number of revolutions of the output shaft 33. On the other hand, as shown in (d) of FIG. 3, the number of revolutions of the engine is maintained at a substantially constant number of revolutions in a no-load state.

Also, if the gear connecting is started at the time T3, the shifting control unit 83 outputs a control electric current for controlling the first clutch hydraulic oil adjustment unit 85 using the hydraulic pressure control unit 82 in such a manner that a pressure higher than the standby pressure is supplied to the first clutch 21. Thus, the first hydraulic pressure chamber 26A of the first clutch 21 is filled with the hydraulic oil. At this time, if the first clutch 21 become a half clutch state, the hydraulic oil acts in a direction increasing the number of revolutions of the first output shaft 31, i.e., in a direction assisting synchronizing by the second synchro mechanism 56, thereby effectively working on synchronizing.

If, as shown in (d) of FIG. 3, the number of revolutions on the to-be-engaged side becomes equal to the number of revolutions of the engine (Time T4), the shifting control unit 83 outputs a control electric current for controlling the first clutch hydraulic oil adjustment unit 85 using the hydraulic pressure control unit 82 in such a manner that the standby pressure is supplied to the first clutch 21. Thus, a pressure of the first hydraulic pressure chamber 26A of the first clutch 21 is adjusted to the standby pressure.

If synchronizing between the output shaft 33 (the sleeve of the second synchro mechanism 56) and the 2nd stage main gear 63 is completed (Time T5), as shown in (b) of FIG. 3, the second synchro mechanism 56 moves the sleeve to a position, where the sleeve is coupled with a dog gear of the 2nd stage main gear 63, thereby completing the gear connecting of the 2nd stage main gear 63 (Time T6).

Once the gear connecting of the 2nd stage main gear 63 is completed, the shifting control unit 83 controls the hydraulic pressure control unit 82 to gradually increase the pressure of the hydraulic oil, which is to be supplied to the first clutch 21, to a predetermined maximum pressure (Time T7) and then maintains this state until an instruction of changing the first clutch 21 into the disengaging state is provided thereto.

If the gear connecting has been completed at the time T6 and then the pressure of the hydraulic oil to be supplied to the first clutch 21 is gradually increased, the first clutch 21 first becomes the half clutch state and then slip thereof in the half clutch state gradually decreases. Therefore, as shown in (d) of FIG. 3, after the time T6, a difference between the number of revolutions on the to-be-engaged side and the number of revolutions of the engine is gradually reduced, and then at the time T7, the number of revolutions on the to-be-engaged side becomes equal to the number of revolutions of the engine, so that the first clutch 21 becomes a fully engaged state.

Herein, in order to clarify the effects of the shifting control device 80 according to the present embodiment, comparison thereof with a comparative example will be made.

In the comparative example, as shown by a broken line in (c) of FIG. 3, supplying a hydraulic oil to the first hydraulic pressure chamber 26A of the first clutch 21 is started after the time T6 when gear connecting of a gear being shifted to is completed. Therefore, a long period of time is required from a time when filling a hydraulic oil into the first hydraulic pressure chamber 26A is started until the first hydraulic pressure chamber 26A becomes the standby pressure. For this reason, a long period of time is required until the first clutch 21 becomes a fully engaged state by way of a half clutch state. Accordingly, the fully engaged state where the number of revolutions on the to-be-engaged side and the number of revolutions of the engine become equal to each other is realized at a time T8, which is later than the time T7 when it can be realized in the present embodiment, as shown in (d) of FIG. 3. From the above, it can be seen that shifting in the present embodiment can be completed earlier than in the comparative example.

As set forth above, according to the gear-shifting control device 80 of the present embodiment, in at least one of: a case where, when upshifting which involves clutch switching and gear changing is performed, the number of revolutions of an input shaft connected to a to-be-engaged clutch is higher than the number of revolutions of the engine before the upshifting is performed; or a case where, when downshifting which involves the clutch switching and the gear changing is performed, the number of revolutions of the input shaft connected to the to-be-engaged clutch is lower than the number of revolutions of the engine before the downshifting is performed, a pressure of the hydraulic oil to be supplied to the to-be-engaged clutch is set to be higher than the standby pressure thereof during a period of time from when gear disconnecting of a gear being changed from is completed until the number of revolutions of the input shaft becomes equal to the number of revolutions of the engine. Therefore, it is possible to quickly perform shifting.

Meanwhile, the present disclosure is not limited to the foregoing embodiments, and accordingly, appropriate changes can be made thereto without departing from the spirit and scope of the present disclosure.

For example, although in the foregoing embodiments, the pressure of the hydraulic oil to be supplied to the to-be-engaged clutch is set to be higher than the standby pressure thereof during a period of time from when gear disconnecting is completed until the number of revolutions of the input shaft connected to the to-be-engaged clutch becomes equal to the number of revolutions of the engine 10, the present disclosure is not limited thereto. During a period of time from when the gear disconnecting is completed until the number of revolutions of the input shaft connected to the to-be-engaged clutch becomes equal to the number of revolutions of the engine 10, the pressure of the hydraulic oil to be supplied to the clutch may be set to the standby pressure thereof. Also, during at least a part of a period of time from when the gear disconnecting is completed until the number of revolutions of the input shaft connected to the to-be-engaged clutch becomes equal to the number of revolutions of the engine 10, the pressure of the hydraulic oil to be supplied to the to-be-engaged clutch may be set to be higher than the standby pressure thereof.

Further, although in the foregoing embodiments, the dual-clutch transmission is configured such that when upshifting which involves switching of a clutch into the engaged stage and changing of a gear to be coupled to the output shaft connected to the vehicle drive system is performed, the number of revolutions of an input shaft connected to a to-be-engaged clutch is higher than the number of revolutions of the driving source before the upshifting is performed, and also such that, when downshifting which involves switching of a clutch into the engaged stage and changing of a gear to be coupled to the output shaft connected to the vehicle drive system is performed, the number of revolutions of the input shaft connected to the to-be-engaged clutch is lower than the number of revolutions of the driving source before the downshifting is performed, the present disclosure is not limited thereto. The dual-clutch transmission may be configured in other manners. In this case, on the basis of aspects of shifting and/or sensor values, the shifting control unit 83 may determine whether or not a current state corresponds to at least one of a case where, when upshifting which involves changing of a gear to be coupled to the output shaft connected to the vehicle drive system is performed, the number of revolutions of an input shaft connected to a to-be-engaged clutch is higher than the number of revolutions of the engine before the upshifting is performed, or a case where, when downshifting which involves switching of a clutch into the engaged stage and changing of a gear to be coupled to the output shaft connected to the vehicle drive system is performed, the number of revolutions of an input shaft connected to a to-be-engaged clutch is lower than the number of revolutions of the engine before the downshifting is performed.

Also, although the foregoing embodiments are directed to the dual-clutch transmission 1 having the subsidiary transmission portion 40, the present disclosure is not limited thereto, but may be applied to any dual-clutch transmissions having no subsidiary transmission portion.

This application is based on Japanese Patent Application No. 2015-231819 filed on Nov. 27, 2015, the entire contents of which are incorporated herein by reference.

INDUSTRIAL APPLICABILITY

The control device for the dual-clutch transmission according to the present disclosure is useful in that it is possible to quickly perform shifting, which involves both switching of a clutch into an engaged state and changing of a gear.

REFERENCE SIGNS LIST

1: Dual-clutch transmission
10: Engine
11: Output shaft
20: Dual-clutch device
21: First clutch
22: Second clutch
26, 29: Piston
26A: First hydraulic pressure chamber
29A: Second hydraulic pressure chamber
30: Transmission mechanism
31: First input shaft
32: Second input shaft
33: Output shaft
34: Subsidiary shaft
40: Subsidiary transmission portion
41: First splitter gear pair
42: Second splitter gear pair
50: Main transmission portion
51: First output gear pair
52: 3rd stage subsidiary gear
53: 3rd stage main gear
55: First synchro mechanism
56: Second synchro mechanism
61: Second output gear pair
62: 2nd stage subsidiary gear
63: 2nd stage main gear
71: Third output gear pair
72: 1st stage subsidiary gear
73: 1st stage main gear
80: Shifting control device
81: Control unit
82: Hydraulic pressure control unit
83: Shifting control unit
84: Gear shifter
85: First clutch hydraulic oil adjustment unit
86: Second clutch hydraulic oil adjustment unit

The invention claimed is:

1. A control device for a dual-clutch transmission in which a clutch device including a first clutch and a second clutch is provided between a driving source and a transmission mechanism, and a driving power transmission path from the driving source to a vehicle drive system is capable of being switched between a transmission line via the first clutch and a transmission line via the second clutch, wherein the first clutch and the second clutch are capable of being switched between an engaged state and a disengaged state depending on a hydraulic pressure supplied thereto, the control device comprising a controller configured to:

in at least one of: (i) a case where, when upshifting which involves switching between the first clutch and the second clutch and changing of a gear to be coupled to an output shaft connected to the vehicle drive system is performed, a number of revolutions of an input shaft connected to a to-be-engaged clutch, which is a clutch among the first clutch and the second clutch to be switched into the engaged state, is higher than a number of revolutions of the driving source before the upshifting is performed; or (ii) a case where, when downshifting which involves the switching in the engaged state and the changing of the gear to be coupled to the output shaft connected to the vehicle drive system is performed, the number of revolutions of the input shaft connected to the to-be-engaged clutch is lower than the number of revolutions of the driving source before the downshifting is performed, supply the to-be-engaged clutch with a hydraulic oil at a pressure equal to or higher than a standby pressure that is required for maintaining the to-be-engaged clutch in a state immediately before being switched into the engaged state, during at least a part of a period of time from when gear disconnecting of a gear before being changed is completed until the number of revolutions of the input shaft becomes equal to the number of revolutions of the driving source, and then supply the to-be-engaged clutch with the hydraulic oil at the standby pressure until gear connecting of a gear being shifted to is completed; and cause the to-be-engaged clutch to be engaged by supplying the to-be-engaged clutch with the hydraulic oil at a pressure higher than the standby pressure after the gear connecting of the gear being shifted to is completed.

2. The control device for the dual-clutch transmission according to claim 1,
wherein the controller is configured to supply the to-be-engaged clutch with the hydraulic oil at the pressure equal to or higher than the standby pressure from immediately after the gear disconnecting of the gear before being changed is completed.

3. The control device for the dual-clutch transmission according to claim 1,
wherein the controller is configured to supply the to-be-engaged clutch with the hydraulic oil at a pressure higher than the standby pressure during the at least a part of the period of time from when the gear disconnecting of the gear before being changed is completed until the number of revolutions of the input shaft becomes equal to the number of revolutions of the driving source.

4. The control device for the dual-clutch transmission according to claim 1,
wherein the dual-clutch transmission is configured such that, when the upshifting which involves the switching in the engaged state and the changing of the gear to be coupled to the output shaft connected to the vehicle drive system is performed, the number of revolutions of the input shaft connected to the to-be-engaged clutch is higher than the number of revolutions of the driving source before the upshifting is performed, and such that, when the downshifting which involves the switching in the engaged state and the changing of the gear to be coupled to the output shaft connected to the vehicle drive system is performed, the number of revolutions of the input shaft connected to the to-be-engaged clutch is lower than the number of revolutions of the driving source before the downshifting is performed.

5. The control device for the dual-clutch transmission according to claim 4,
wherein the dual-clutch transmission includes: a first input shaft connected to the first clutch; a second input shaft connected to the second clutch; and a subsidiary shaft normally coupled with the first input shaft and the second input shaft, and
wherein a first splitter gear pair coupling the first input shaft with the subsidiary shaft and a second splitter gear pair coupling the second input shaft with the subsidiary shaft have different gear ratios.

6. A dual-clutch transmission comprising:
a clutch device provided between a driving source and a transmission mechanism and including a first clutch and a second clutch; and
a control device capable of switching a driving power transmission path from the driving source to a vehicle drive system between a transmission line via the first clutch and a transmission line via the second clutch,
wherein the first clutch and the second clutch are capable of being switched between an engaged state and a disengaged state depending on a hydraulic pressure supplied thereto,
wherein the control device includes a controller configured to:
in at least one of: (i) a case where, when upshifting which involves switching between the first clutch and the second clutch and changing of a gear to be coupled to an output shaft connected to the vehicle drive system is performed, a number of revolutions of an input shaft connected to a to-be-engaged clutch, which is a clutch among the first clutch and the second clutch to be switched into the engaged state, is higher than a number of revolutions of the driving source before the upshifting is performed; or (ii) a case where, when downshifting which involves the switching in the engaged state and the changing of the gear to be coupled to the output shaft connected to the vehicle drive system is performed, the number of revolutions of the input shaft connected to the to-be-engaged clutch is lower than the number of revolutions of the driving source before the downshifting is performed, supply the to-be-engaged clutch with a hydraulic oil at a pressure equal to or higher than a standby pressure that is required for maintaining the to-be-engaged clutch in a state immediately before being switched into the engaged state, during at least a part of a period of time from when gear disconnecting of a gear before being changed is completed until the number of revolutions of the input shaft becomes equal to the number of revolutions of the driving source, and then supply the to-be-engaged clutch with the hydraulic oil at the standby pressure until gear connecting of a gear being shifted to is completed; and
cause the to-be-engaged clutch to be engaged by supplying the to-be-engaged clutch with the hydraulic oil at a pressure higher than the standby pressure after the gear connecting of the gear being shifted to is completed.

7. The dual-clutch transmission according to claim 6,
wherein the controller is configured to supply the to-be-engaged clutch with the hydraulic oil at the pressure equal to or higher than the standby pressure from immediately after the gear disconnecting of the gear before being changed is completed.

8. The dual-clutch transmission according to claim 6,
wherein the controller is configured to supply the to-be-engaged clutch with the hydraulic oil at a pressure higher than the standby pressure during the at least a part of the period of time from when the gear disconnecting of the gear before being changed is completed until the number of revolutions of the input shaft becomes equal to the number of revolutions of the driving source.

9. The dual-clutch transmission according to claim 6,
wherein the dual-clutch transmission is configured such that, when the upshifting which involves the switching in the engaged state and the changing of the gear to be coupled to the output shaft connected to the vehicle drive system is performed, the number of revolutions of the input shaft connected to the to-be-engaged clutch is higher than the number of revolutions of the driving source before the upshifting is performed, and such that, when the downshifting which involves the switching in the engaged state and changing of the gear to be coupled to the output shaft connected to the vehicle drive system is performed, the number of revolutions of the input shaft connected to the to-be-engaged clutch is lower than the number of revolutions of the driving source before the downshifting is performed.

10. The dual-clutch transmission according to claim 9, further comprising:
a first input shaft connected to the first clutch;
a second input shaft connected to the second clutch; and
a subsidiary shaft normally coupled with the first input shaft and the second input shaft,
wherein a first splitter gear pair coupling the first input shaft with the subsidiary shaft and a second splitter gear pair coupling the second input shaft with the subsidiary shaft have different gear ratios.

* * * * *